(12) United States Patent
Chai et al.

(10) Patent No.: US 10,662,075 B2
(45) Date of Patent: May 26, 2020

(54) METHOD AND APPARATUS FOR THE RECOVERY AND DEEP TREATMENT OF POLLUTED ACID

(71) Applicant: Central South University, Hunan (CN)

(72) Inventors: Liyuan Chai, Hunan (CN); Qingwei Wang, Hunan (CN); Guomin Jiang, Hunan (CN); Chengyun Zhou, Hunan (CN); Qingzhu Li, Hunan (CN); Zhihui Yang, Hunan (CN); Weirong Gao, Hunan (CN)

(73) Assignee: Central South University, Hunan (CN)

( * ) Notice: Subject to any disclaimer, the term of this patent is extended or adjusted under 35 U.S.C. 154(b) by 33 days.

(21) Appl. No.: 16/066,902

(22) PCT Filed: Sep. 9, 2016

(86) PCT No.: PCT/CN2016/098594
§ 371 (c)(1),
(2) Date: Jun. 28, 2018

(87) PCT Pub. No.: WO2017/113882
PCT Pub. Date: Jul. 6, 2017

(65) Prior Publication Data
US 2019/0023585 A1 Jan. 24, 2019

(30) Foreign Application Priority Data
Dec. 28, 2015 (CN) .......................... 2015 1 0992841

(51) Int. Cl.
C02F 9/00 (2006.01)
C02F 1/00 (2006.01)
(Continued)

(52) U.S. Cl.
CPC ................ *C02F 1/001* (2013.01); *B01D 3/10* (2013.01); *B01D 3/143* (2013.01); *B01D 3/145* (2013.01);
(Continued)

(58) Field of Classification Search
None
See application file for complete search history.

(56) References Cited

U.S. PATENT DOCUMENTS

2008/0056982 A1    3/2008  Mislenkov
2018/0321150 A1*  11/2018  Gavaris .................. A61B 3/101

FOREIGN PATENT DOCUMENTS

CN         1789445      6/2006
CN       101429594      5/2009
(Continued)

*Primary Examiner* — Chester T Barry
(74) *Attorney, Agent, or Firm* — IP & T Group LLP

(57) ABSTRACT

A method and an apparatus for recovery and deep treatment of a polluted acid. The method comprises the following main steps: (1) selectively adsorbing rare and noble metals, such as rhenium, selenium and the like; (2) separating copper from arsenic to recover the copper; (3) carrying out efficient vulcanization to perform deep arsenic removal; (4) carrying out electrodialysis to pre-concentrate acid; (5) evaporating and concentrating the acid; (6) carrying out an air-stripping method to remove fluorine and chlorine. The polluted acid treatment apparatus mainly comprises a precision filtering tank, a special adsorbing tank, a copper-arsenic separation device, a vulcanization device, an electrodialysis device, an evaporative concentration device, and an air-stripping device. The method and the apparatus can implement efficient recovery of valuable elements in polluted acid wastewater and separate treatment harmful elements, has obvious economical, social and environmental benefits, and has wide application prospects.

16 Claims, 2 Drawing Sheets

(51) Int. Cl.
  *B01D 3/10*   (2006.01)
  *B01D 3/14*   (2006.01)
  *C02F 1/04*   (2006.01)
  *C02F 1/26*   (2006.01)
  *C02F 1/42*   (2006.01)
  *C02F 1/469*  (2006.01)
  *C02F 1/68*   (2006.01)
  *C02F 1/20*   (2006.01)
  *C02F 101/10* (2006.01)
  *C02F 101/14* (2006.01)
  *C02F 101/20* (2006.01)
  *C02F 103/16* (2006.01)
  *B01D 1/00*   (2006.01)

(52) U.S. Cl.
  CPC .......... *C02F 9/00* (2013.01); *B01D 1/00* (2013.01); *C02F 1/046* (2013.01); *C02F 1/048* (2013.01); *C02F 1/20* (2013.01); *C02F 1/26* (2013.01); *C02F 1/42* (2013.01); *C02F 1/4693* (2013.01); *C02F 1/68* (2013.01); *C02F 2101/101* (2013.01); *C02F 2101/103* (2013.01); *C02F 2101/106* (2013.01); *C02F 2101/14* (2013.01); *C02F 2101/203* (2013.01); *C02F 2103/16* (2013.01); *C02F 2301/08* (2013.01); *Y02P 10/212* (2015.11)

(56) References Cited

FOREIGN PATENT DOCUMENTS

| | | |
|---|---|---|
| CN | 103553248 | 2/2014 |
| CN | 103599773 | 2/2014 |
| CN | 104445095 | 3/2015 |
| CN | 105439355 | 3/2016 |
| JP | 4353731 | 10/2009 |

* cited by examiner

METHOD AND APPARATUS FOR THE RECOVERY AND DEEP TREATMENT OF POLLUTED ACID

This application is a national stage application of PCT/CN2016/098594 filed on Sep. 9, 2016, which claims priority of Chinese patent application number 201510992841.X filed on Dec. 28, 2015. The disclosure of each of the foregoing applications is incorporated herein by reference in its entirety.

TECHNICAL FIELD

The invention relates to a method and an apparatus for the recovery and deep treatment of polluted acid, and belongs to the field of environmental protection in metallurgical and chemical industry. In particular, the present invention relates to a method and an apparatus for the recovery and deep treatment of the polluted acid that is the wastewater generated from non-ferrous smelting flue gas washing process in a sulfuric acid-making system.

BACKGROUND ART

China is a major producer of non-ferrous metals, and ranks first in non-ferrous metal production in the world for 11 consecutive years. In the smelting process of non-ferrous metals, a large amount of $SO_2$ flue gas containing lead, arsenic, mercury, and other heavy metal dust and fume is generated. The wet purification of flue gas in acid-making system produces a large amount of wastewater i.e. polluted acid wastewater. In the polluted acid wastewater generated from the smelting of copper, nickel and gold, arsenic is the highest in concentration and most harmful among the pollutants, and heavy metal ions such as lead, cadmium, zinc, and copper are also coexisted at the same time; in the polluted acid wastewater generated from the smelting of lead and zinc, mercury and arsenic are the main pollutants, lead and zinc are also coexisted at a high concentration, and the anions are mainly fluoride and chloride ions. It is difficult to treat the polluted acid wastewater because its complex composition, high concentration of heavy metals, large fluctuation, complex forms of heavy metals and high acidity. It is also a difficult point of the heavy metal wastewater treatment in non-ferrous smelting enterprises.

At present, domestic primary methods for the treatment of polluted acid wastewater include neutralization, vulcanization-neutralization, neutralization-iron salt co-precipitation, and treatment by membrane technology. However, they all have their own drawbacks, and the treatment results are not satisfactory. Wherein, neutralization method has low treatment cost, but it produces a large amount of residue, and it is difficult to stably achieve a standard for the treated wastewater. Although vulcanization-neutralization method reduces the amount of residue compared with neutralization-precipitation method, it still produces a large amount of neutralization residues, and results in the high hardness of water and salt accumulation due to calcium and sodium ions entering the system in the treatment process, which is not conducive to wastewater recycle. The neutralization-iron salt co-precipitation method is widely used, but it has the main problems such as large amount of residues produced, inefficient use of resources, high disposal costs of residues later, risk of secondary environmental pollution. Membrane technology can be applied to treat polluted acid wastewater, with the characteristics of low energy consumption, small footprint, relatively low cost, and have become the focus of research in recent years. Recovering the acid in the wastewater through a selective ion exchange membrane facilitates the subsequent treatment of the heavy metals in the wastewater. The methods for the treatment of heavy metal wastewater by membrane technology mainly include diffusion dialysis, electrodialysis, nanofiltration and the like. Chinese Patent application No. 201310501529.7, now publication CN103553248, relates to a method and an apparatus for recycling heavy metal polluted acid wastewater, and discloses a method for recovering waste acid by an electrodialysis device and recycling heavy metals by a vulcanization device. However, the low acidity and the high concentration of fluoride and chloride ions in the regenerated acid have limited its reuse. Chinese Patent application No. 201410786969.6, now publication CN104445095, relates to a method of purifying smelting polluted acid, and discloses a method of purifying polluted acid by diffusing dialysis, ion exchange, and multi-effect evaporation; although the high recovery of acidity could be achieved, supplement of a large amount of new water increases the volume of polluted acid to be further treated, and neutralization treatment of the low-acidity wastewater containing chlorine, fluorine and heavy metals is stilled necessary, which is not conducive to reuse. Therefore, it is an important subject in the field of environmental governance in non-ferrous metal industry to develop an efficient new process for recycling polluted acid wastewater generated from washing of smelting flue gas.

SUMMARY OF THE INVENTION

In view of the problems occurring in the process of polluted acid wastewater treatment by the existing methods, the present invention provides a method and an apparatus for the high efficient recovery of valuable elements and separation of harmful elements from the polluted acid wastewater, through which the problems such as recovery of valuable resources from polluted acid, large amount of precipitation residues and secondary pollution could be solved.

A method for the recovery and deep treatment of polluted acid comprises the following steps:

(1) pretreatment and selective adsorption: polluted acid wastewater is first filtered through a precision filter to remove suspended matters, and then enters a special absorbing tank to selectively adsorb rare and noble metals, such as rhenium and selenium;

(2) copper is separated from arsenic by using arsenic sulfide or arsenic sulfide residue;

(3) after the separation of copper and arsenic, the filtrate is subjected to arsenic deep removal by using a vulcanizing agent, and the obtained arsenic sulfide residue is reused in step (2);

(4) after the separation of arsenic residue, the filtrate enters the electrodialysis device for the pre-concentration of the acid and the separation and enrichment of the fluorine and chlorine;

(5) the concentrate from the electrodialysis device enters the evaporative concentration device for further acid concentration, and the condensation water is recycled;

(6) air-stripping separation method is used to removal of fluorine and chlorine in the concentrated acid solution, and then the acid can be reused in process or sulfuric acid production system, and high fluorine and chlorine mixed acid is sold or further recycled.

The method for the recovery and deep treatment of polluted acid of the present invention, the scheme also includes the following steps:

(1) pretreatment and selective adsorption: polluted acid wastewater is first filtered through a precision filter to remove suspended matters, and then enters a special adsorbing tank to selectively adsorb rare and noble metals, including rhenium and selenium;

(2) copper is separated from arsenic by using arsenic sulfide residue; and (3) after the separation of copper and arsenic, the filtrate is subjected to arsenic deep removal by using a vulcanizing agent, and the obtained arsenic sulfide residue is reused in step (2).

In the step (2), the arsenic sulfide residue used for the first separation of copper and arsenic comes from the arsenic sulfide residue (for example, polluted acid arsenic residue, electrolytic waste liquid arsenic residue, etc.) obtained by adding sulfide to polluted acid wastewater or electrolytic waste liquid from smelting enterprises.

The polluted acid in step (1) is the wastewater generated from the flue gas scrubbing system in the non-ferrous metal smelting, during the acid-production and purification process, has a mass concentration of sulfuric acid between 2% and 8%, and contains one or more of copper, lead, zinc, cadmium, arsenic, nickel, cobalt, manganese, tin, antimony, selenium, mercury, indium, and rhenium ions, as well as fluorine, chlorine, sulfate radical and hydrogen ions.

The pore size of the filter material used during the precision filtration in step (1) is 0.5 to 10 μm.

The special adsorbing tank of step (1) is filled with selective ing filler which is ion exchange material functionalized by nitrogen-containing heterocyclic compound. The filler is prepared by carrying out Blanc chloromethylation reaction on polymers such as polypropylene-styrene or styrene-divinylbenzene, then soaking the reaction product in a solution containing a nitrogen-containing heterocyclic compound functional monomer to perform reaction, and dried after that.

During the separation of copper and arsenic in step (2), the arsenic sulfide or arsenic sulfide residue is added to the polluted acid wastewater (which is treated with adsorbing tank) at an As/Cu molar ratio of 1 to 5:1. The reaction is carried out at 40 to 80° C. for 1 to 3 h, and the resulting product is filtered to obtain copper-enriched residue and arsenic-enriched solution.

The vulcanizing agent used in step (3) is one or more of sodium sulfide, sodium hydrosulfide, calcium sulfide, barium sulfide, and hydrogen sulfide. The used hydrogen sulfide can be produced by the reaction of sodium sulfide with sulfuric acid or the reaction of sulfur with one or more of hydrogen gas, methanol, natural gas, and coke oven gas.

The electrodialysis device of step (4) is of splint type or roll type, the used membrane is a homogeneous ion exchange membrane or a bipolar membrane that is resistant to contamination and corrosion, the power supply adopts reversal mode or frequent reversal mode, and the pre-concentration allows sulfuric acid to be concentrated to a mass fraction of 10% to 20%.

The evaporative concentration device of step (5) adopts second-effect or triple-effect evaporation or membrane distillation, and the acid is concentrated from a sulfuric acid mass fraction range of 10%-20% to 30%-60%, the evaporation chamber of the second-effect or triple-effect evaporation chamber and the heat exchanger is made of one or more of graphite, PP, PVDF, PTFE, the operation temperature of the membrane distillation is 60 to 90° C., vacuum is achieved by a water-circulating vacuum pump or a plunger vacuum pump, the degree of vacuum during operation is $-0.05$ to $-0.09$ MPa, the membrane module is operated by using submerged reduced-pressure membrane or multi-effect membrane; and in the membrane distillation, the filter pore size is 0.2 to 0.5 μm and the flux is 3 to 5 $L/m^2$.

In step (6), fluorine- and chlorine-containing concentrated acid solution obtained after evaporation is subjected to fluorine and chlorine removal by air-stripping desorption method to give fluorine- and chlorine-containing mixed acid, the temperature for hot air-stripping is 110 to 120° C., and the time for air-stripping is 1 to 2 h.

The apparatus matched with the method for the recovery and deep treatment of polluted acid is formed by a precision filter, a special adsorbing tank, a copper-arsenic separation device, a vulcanization device, an electrodialysis device, an evaporative concentration device and an air-stripping device connected in sequence.

The present invention has at least one of the following beneficial effects:

1. The method of selective adsorption is used to adsorb and enrich rare and noble metal ions from polluted acid wastewater, such that high value-added components in the polluted acid are fully recovered in a relatively simple manner, and the enriched solution with a high acidity is obtained without the secondary contamination, which facilitates the subsequent treatment and utilization of polluted acid.

2. At present, polluted acid wastewater is often treated with lime neutralization and vulcanization, producing a large amount of arsenic sulfide residue (also known as arsenic filter cake). The elements such as copper, arsenic, sulfur contained therein are hazardous wastes, and the separation of copper and arsenic is difficult. Alkali leaching method is commonly used to recover valuable metals in arsenic filter cakes, but the alkali consumption is large, and subsequent treatment of the arsenic-containing strong alkali liquor is still a problem. For pressure oxidation leaching method, the leaching rate of copper and arsenic exceeded 90%, however, there have problems of high equipment requirements and high costs. With respect to the problem of separating copper and arsenic in arsenic filter cake during vulcanization of polluted acid, the inventor was surprised to find that if the filtrate obtained by the separation of copper and arsenic is subjected to deep arsenic removal through a vulcanizing agent, the resulting arsenic sulfide residue can be reused for the separation of copper and arsenic, and as compared with performing leaching and separation to the resulting arsenic filter cake, there have the following advantages: the efficient separation of copper and arsenic is realized in the process of the treatment of polluted acid, and high-grade copper sulfide residue is obtained at the same time, which avoids the massive generation of arsenic filter cake, ensures the recovery of copper, and provides conditions for the deep purification of arsenic.

3. The method combining electrodialysis with evaporation is used for the polluted acid wastewater treatment to minimize the operating cost. According to the characteristics of polluted acid wastewater, pre-concentration is carried out by electrodialysis under the conditions of relatively low acid concentration, and concentration is continued with multi-effect evaporation or membrane distillation under the conditions of relatively high acid concentration.

4. Enrichment of fluorine and chlorine is achieved by membrane distillation technology and evaporative concentration, which facilitate the separation of fluorine and chlorine. Air-stripping desorption method is used to separate fluorine and chlorine, and acid is further concentrated such that high fluorine and chlorine mixed acid and low-fluorine low-chloride sulfuric acid can be obtained. Sulfuric acid can be returned to the system for use, and the fluorine- and chlorine-containing mixed acid can be discharged from the system.

5. The present invention can realize reclamation and recycling of polluted acid wastewater, full recovery of rare and noble metals, efficient separation of copper and arsenic and deep purification of arsenic in polluted acid, in which process the high-grade copper residue was obtained, arsenic residue was discharged separately, and fluorine and chlorine was enriched and discharged and sulfuric acid was reused. The process has the features of efficient purification, comprehensive recovery of resources efficiently, strong impact resistance, low operation cost, less arsenic residue produced, low risk of secondary pollution, and good economic and environmental benefits.

Figure 1:
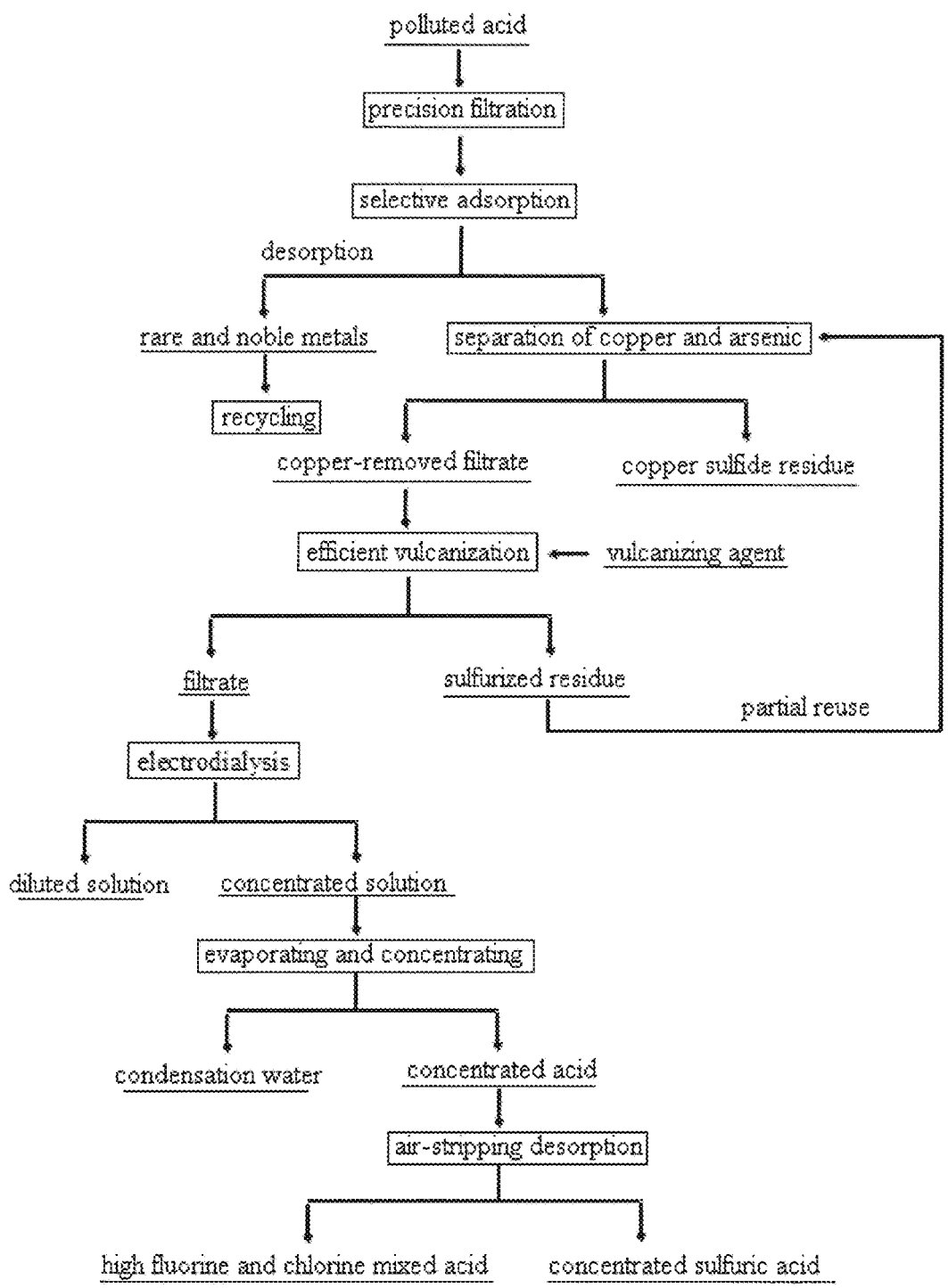
FIG. 1 shows a process flow chart of the present invention.
Figure 2:
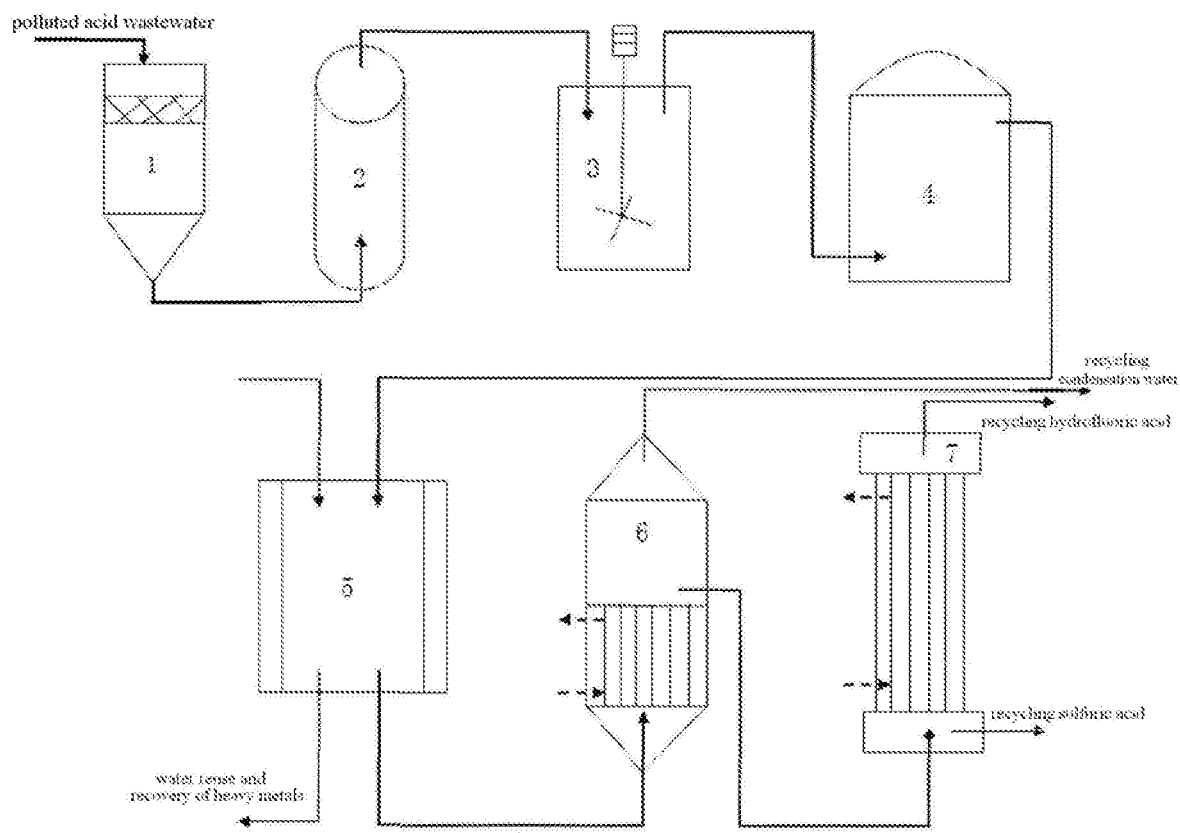
FIG. 2 shows an apparatus chart of the present invention.

1 represents a precision filter, 2 represents a special adsorbing tank, 3 represents a copper-arsenic separation device, 4 represents a vulcanization device, 5 represents an electrodialysis device, 6 represents an evaporative concentration device, and 7 represents a air-stripping device.

In the present invention, polluted acid wastewater is filtered through a precision filter precision filter 1 to remove suspended matters, and then enters a special adsorbing tank 2 to selectively adsorb rare and noble metals including rhenium and selenium; arsenic sulfide or arsenic sulfide residue is utilized to separate copper and arsenic in the copper-arsenic separation device 3; after the separation of copper and arsenic, the filtrate is subjected to arsenic deep removal by using a vulcanizing agent in the vulcanization device 4, and the resulting arsenic sulfide residue is reused for the separation of copper and arsenic; after the separation of arsenic residue, the filtrate enters the electrodialysis device 5 to pre-concentrate the acid and separate and enrich the fluorine and chlorine; the concentrate from the electrodialysis device enters the evaporative concentration device 6 to continue acid concentration, and the condensation water is recycled; the concentrated acid is subjected to fluorine and chlorine removal with a air-stripping device 7, then reused in the process or sulfuric acid production system, and high fluorine and chlorine mixed acid is sold or further recycled.

BEST MODES FOR CARRYING OUT THE EMBODIMENTS

The following examples are intended to further illustrate the invention without limiting it.

Arsenic sulphide residue was obtained for the first time: sulfide was put into the polluted acid to precipitate the most of the copper and arsenic, resulting in a mixed residue of copper sulfide and arsenic sulfide. This residue was added to the untreated polluted acid in proportion, the copper in the polluted acid was displaced by arsenic sulfide in the mixed residue to produce copper sulphide residue, through which way a higher-grade copper residue and an arsenic-edriched solution were obtained. The sulfide was used to precipitate the arsenic-edriched solution to obtain the arsenic sulfide residue, and the arsenic sulfide residue can be used in the displacement and separation process of copper in step 2 of the process of the present invention.

Polluted acid of a smelting enterprise was subjected to water homogenization, and filtered through a precision filter (the filter material is an organic porous material PP with a pore size of 10 μm, and the form of the filter is a bag filter) to remove particulate and colloidal impurities, and then allowed to enter a special adsorbing tank. The arsenic sulfide residue was added to the water discharged from the adsorbing tank at an As/Cu ratio of 2:1, and reacted at 80° C. for 1.5 h for the separation of copper and arsenic, and the copper-enriched residue (copper sulfide residue) and the arsenic-enriched solution were obtained after filtration. Hydrogen sulfide was added into arsenic-enriched solution in an amount of 1.1 times the theoretical amount, and reacted for 30 minutes in the gas-liquid enhanced vulcanization device. The product of the reaction was subjected to solid-liquid separation to obtain arsenic sulfide residue, which was reused partly for the separation of copper and arsenic. The obtained solution entered the electrodialysis device to concentrate acid and separately concentrate fluorine and chlorine at the current density of 40 mA/cm$^2$, generating a high acidity solution containing high concentrations of fluorine, chlorine and a wastewater containing low concentrations of chlorine, fluorine and acid (diluted solution with a low concentration of heavy metals). The high fluorine, chlorine solution was further concentrated by triple-effect evaporation to an acid concentration of 50%, and the condensation water with low concentrations of fluorine and chlorine obtained at the same time can be reused. The concentrated acid was subjected to hot air-stripping to remove fluorine and chlorine at 120° C. for 2 h. After removal of fluorine and chlorine, sulfuric acid could be reused in the smelting system. The gas with high fluorine and chlorine was condensed and absorbed to get a highfluorine and chlorine mixed acid. Hydrofluoric acid and hydrochloric acid separated as by-products can be reused or for sale.

After treatment by selective adsorption, the recovery rate of rhenium in the polluted acid wastewater could reach above 95% with arsenic adsorption less than 1%, which could realize efficient separation of rhenium and arsenic. Through the reuse of the arsenic sulfide residue, the recovery of copper in the separation process of copper and arsenic was more than 99%, the grade of copper in the resulting copper sulfide residue was 58%, and the content of arsenic was 3.2%. The arsenic removal rate of the arsenic-enriched solution through vulcanization was 99.9%, the content of arsenic in the solution was 0.3 mg/L, and the grade of arsenic in the arsenic residue was 55%. After pre-concentration and separation by electrodialysis, the acid was concentrated from 3% to 12%, and meanwhile the separation rates of fluorine and chlorine were 85% and 90%, respectively; the mass concentration of acid increased from 12% to 50% by triple-effect evaporation; after the removal of fluorine and chlorine, the acidity could reach 70%, the contents of fluorine and chlorine in the acid were 150 mg/L and 120 mg/L, respectively, and the concentration of fluorine and chlorine in the resulting fluorine- and chlorine-containing mixed acid solution could reach above 30 g/L. After the removal of fluorine and chlorine, sulfuric acid could be returned to the process of electrolysis, acid production, etc. The method maximizes the use of resources and achieves the goal of recycling polluted acid wastewater.

What is claimed is:
1. A method for the recovery and treatment of polluted acid wastewater, the method comprising the steps of:
   (1) filtering polluted acid wastewater through a filter to remove suspended matter and generate a first filtrate, and feeding the first filtrate in an adsorbing tank to selectively adsorb rare and noble metals and remove them from the first filtrate and generate a second filtrate and a stream with the adsorbed rare and noble metals and;
(2) treating the second filtrate with arsenic sulfide or arsenic sulfide residue to separate copper from arsenic and remove the copper from the second filtrate to generate a third filtrate and a copper sulfide residue and;
(3) subjecting the third filtrate to vulcanization using a vulcanizing agent to remove arsenic from the third filtrate and generate the arsenic sulfide residue which is reused in step (2) and a fourth filtrate;
(4) feeding the fourth filtrate in an electrodialysis device for a pre-concentration of the acid in the fourth filtrate to obtain a first concentrated solution of acid;
(5) feeding the first concentrated solution of acid obtained from the electrodialysis device to an evaporative concentration device to further concentrate the acid and obtain a second concentrated acid solution and a condensation water stream which is recycled; and
(6) subjecting the second concentrated acid solution to air-stripping separation for removing fluorine and chlorine from the second concentrated sulfuric acid solution and generate a concentrated acid product and a mixed stream of fluorine, chlorine and acid,
wherein the concentrated acid product can be reused in an acid production system, and the mixed stream of fluorine, chlorine and acid can be sold or further recycled.

2. The method according to claim 1, characterized in that, the polluted acid wastewater in step (1) is acidic wastewater generated from scrubbing of flue gas produced in non-ferrous metal smelting, during an acid-production and purification process,
wherein the polluted acid wastewater has a mass concentration of sulfuric acid between 2% and 8%, and contains one or more of copper, lead, zinc, cadmium, arsenic, nickel, cobalt, manganese, tin, antimony, selenium, mercury, indium, and rhenium ions, as well as fluorine, chlorine, sulfate radical and hydrogen ions.

3. The method according to claim 1, characterized in that, the first concentrated solution of acid has an acid mass fraction of 10% to 20%, the second concentrated acid solution has an acid mass of 30% to 60%, and the pore size of the filter material used during the filtration in step (1) is 0.5 to 10 μm.

4. The method according to claim 1, characterized in that, the adsorbing tank of step (1) is filled with an adsorbing filler which is an ion exchange material functionalized by a nitrogen-containing heterocyclic compound.

5. The method according to claim 1, characterized in that, during step (2) the arsenic sulfide or the arsenic sulfide residue is added to the second filtrate which is treated in the adsorbing tank at an As/Cu molar ratio of 1 to 5:1.

6. The method according to claim 1, characterized in that, in step (2), the separation of copper and arsenic is performed at a temperature of 40 to 80° C., and filtered to obtain copper-enriched residue and arsenic-enriched solution.

7. The method according to claim 1, characterized in that, in step (2), the separation of copper and arsenic is reacted for 1 to 3 h.

8. The method according to claim 1, characterized in that, the vulcanizing agent used in step (3) is one or more of sodium sulfide, sodium hydrosulfide, calcium sulfide, barium sulfide, and hydrogen sulfide.

9. The method according to claim 1, characterized in that, the electrodialysis device of step (4) is of a splint type or a roll type, a used membrane is a homogeneous ion exchange membrane or a bipolar membrane that is resistant to contamination and corrosion, a power supply adopts reversal mode or frequent reversal mode, and the pre-concentration allows sulfuric acid to be concentrated to a mass fraction of 10% to 20%.

10. The method according to claim 1, the evaporative concentration device of step (5) adopts second-effect or triple-effect evaporation or membrane distillation, and the acid is concentrated from a sulfuric acid mass fraction of 10%-20% to 30%-60%, an evaporation chamber of the second-effect or triple-effect evaporation and a heat exchanger adopts one or more of graphite, PP, PVDF and PTFE, an operating temperature for the membrane distillation is 60 to 90° C., a vacuum is achieved by a water-circulating vacuum pump or a plunger vacuum pump, a vacuum during operation is −0.05 to −0.09 MPa, a membrane module is operated by using submerged reduced-pressure membrane distillation or multi-effect membrane distillation; and in the membrane distillation a filter pore size is 0.2 to 0.5 μm and the flux is 3 to 5 L/m2.

11. The method according to claim 1, characterized in that, in step (6), the air-stripping separation is hot air-stripping desorption performed at a temperature of 110 to 120° C., and for a time of 1 to 2 h.

12. An apparatus configured to perform the method according to claim 1, wherein the apparatus includes a filter, an adsorbing tank, a copper-arsenic separation device, a vulcanization device, an electrodialysis device, an evaporative concentration device and an air-stripping device connected in sequence.

13. A method for the recovery and treatment of polluted wastewater sulfuric acid, the method comprising the steps of:
(1) filtering polluted sulfuric acid wastewater through a filter to remove suspended matter and generate a first filtrate, and feeding the first filtrate to an adsorbing tank to selectively adsorb and remove rare and noble metals, including rhenium and selenium from the first filtrate to generate a second filtrate;
(2) treating the second filtrate with arsenic sulfide residue to separate copper from arsenic and remove the copper from the second filtrate to generate a copper sulfide residue and a third filtrate; and
(3) after the removal of copper from the third filtrate, the third filtrate is subjected to vulcanization by adding a vulcanizing agent to remove arsenic, and the resulting arsenic sulfide residue is reused in step (2).

14. The method according to claim 13, characterized in that, in the step (2), the arsenic sulfide residue used for the first separation of copper and arsenic comes from the arsenic sulfide residue obtained by adding sulfide for arsenic removal to polluted acid wastewater or electrolytic waste liquid from smelting enterprises.

15. The method according to claim 13, characterized in that, during the separation of copper and arsenic in the step (2), the sulfide residue is added to the second filtrate at an As/Cu molar ratio of 1 to 5:1.

16. The method according to claim 13, characterized in that, the polluted sulfuric acid wastewater in step (1) is acidic wastewater generated from scrubbing of flue gas, which is produced in non-ferrous metal smelting, during an acid-production and purification process, has a mass concentration of sulfuric acid between 2% and 8%, and contains one or more of copper, lead, zinc, cadmium, arsenic, nickel, cobalt, manganese, tin, antimony, selenium, mercury, indium, and rhenium ions, as well as fluorine, chlorine, sulfate radical and hydrogen ions.

* * * * *